United States Patent
Sen et al.

(10) Patent No.: US 6,330,451 B1
(45) Date of Patent: Dec. 11, 2001

(54) SELECTIVELY DELAYING DATA COMMUNICATIONS IN A WIRELESS COMMUNICATION SYSTEM TO PROVIDE VOICE COMMUNICATIONS CAPACITY

(75) Inventors: Sanjoy K. Sen; Jastinder Jawanda; Kalyan K. Basu; Giri Giridharagopal, all of Plano; Naveen K. Kakani; Sajal Das, both of Denton, all of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/170,843

(22) Filed: Oct. 13, 1998

(51) Int. Cl.[7] ........................................ H04Q 7/00
(52) U.S. Cl. .................... 455/452; 370/229; 370/329
(58) Field of Search .................... 455/452, 453, 455/450, 466; 370/229, 230, 329; 375/329

(56) References Cited

U.S. PATENT DOCUMENTS

| | | | |
|---|---|---|---|
| 5,751,969 | * | 5/1998 | Kapoor ................................ 395/200 |
| 5,790,534 | * | 8/1998 | Kokko ................................. 370/335 |
| 5,793,416 | * | 8/1998 | Rostoker .............................. 348/17 |
| 5,802,465 | * | 9/1998 | Hamalainen ......................... 455/403 |
| 5,812,952 | * | 9/1998 | Ori ...................................... 455/452 |
| 5,867,789 | * | 2/1999 | Olds .................................... 455/453 |
| 5,875,184 | * | 2/1999 | Altvater .............................. 370/330 |
| 5,950,136 | * | 9/1999 | Scott ................................... 455/452 |
| 6,192,029 | * | 2/2001 | Averbuch ............................ 370/229 |

* cited by examiner

Primary Examiner—Daniel Hunter
Assistant Examiner—Nick Corsaro
(74) Attorney, Agent, or Firm—Bruce Garlick; James Harrison (57) ABSTRACT

A wireless communication system selectively delays serviced data communications to produce a desired level of voice communications capacity. The system first determines whether the wireless communication system has sufficient voice communications capacity. If it is determined that the wireless communication system has insufficient voice communications capacity, the system determines a data communications delay that is required to provide sufficient voice communications capacity. Based upon its determination, the system then selectively delays some or all of the data communications to create the sufficient voice communications capacity. In one operation, one data communication serviced by the wireless communication system is selectively delayed to create the sufficient voice communications capacity. In another operation, a plurality of data communications serviced by the wireless communication system are selectively delayed to create the sufficient voice communications capacity. When a plurality of data communications being serviced by the wireless communication system, some of the plurality of the data communications serviced by the wireless communication system are delayed by a first delay level and other of the data communications serviced are delayed by a second delay level.

20 Claims, 7 Drawing Sheets

SELECTIVELY DELAYING DATA COMMUNICATIONS IN A WIRELESS COMMUNICATION SYSTEM TO PROVIDE VOICE COMMUNICATIONS CAPACITY

BACKGROUND

1. Technical Field

The present invention relates generally to cellular wireless communication systems; and more particularly to a method for controlling the flow of data communications within such a wireless communication system to provide voice communications capacity as required.

2. Related Art

Cellular wireless communication systems are generally known in the art to facilitate wireless communications within respective service coverage areas. Such wireless communication systems include a "network infrastructure" that facilitates the wireless communications with subscriber units operating within a service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC) which also couples to the PSTN, the Internet and/or to other MSCs.

A subscribing wireless unit operating within the service coverage area communicates with one or more of the base stations. The base stations route the communications to the MSC via a serving BSC. The MSC routes the communications to another subscribing wireless unit via a BSC/base station path (which may be the same BSC/base station path when the communications are with another subscribing unit serviced by the same base station) or via the PSTN/Internet/other network to a terminating destination.

Various operating standards have been developed to standardize wireless communications. The wireless communication operating standards include, for example, the Advanced Mobile Phone Service (AMPS) standards, the Global Standards for Mobile Communication (GSM), the Code Division Multiple Access (CDMA) standards and the Time Division Multiple Access (TDMA) standards. These operating standards set forth the technical requirements that facilitate compatible operation between equipment of differing vendors.

These operating standards were initially developed to support voice communications but not data communications. With advances in digital computers and data networking technology, however, it has become advantageous to service data communication as well as voice communications under these operating standards.

Presently, wireless communication systems are required to service data communications with laptop computers, data terminals, and fixed wireless access units, among other data devices, in addition to supporting voice communications. Since creating a completely separate network infrastructure to service only data communications would require a great redundancy in network resources, it has been advantageous to retrofit existing wireless systems that were originally constructed to service only voice communications to also service data communications. In retrofitting wireless communication systems to support both voice communications and data communication, new operating standards must be developed (e.g., IS-99). However, determining how such operating standards should work is difficult, especially considering the differing use patterns for data communications as compared to voice communications.

Voice communications typically last for a few minutes and require a dedicated bandwidth during active periods of a call. At other times, no bandwidth is required and allocated channel bandwidth may be temporarily deallocated. The user controls these bandwidth requirements, not the system operator. Thus, when bandwidth is required for voice communications, it must be provided. Voice communications are typically delay sensitive but can tolerate a relatively high Bit Error Rate (BER).

In contrast, data communications often last for tens of minutes and require significant bandwidth through the duration of the data communications. However, as compared to the voice communications which must be serviced on a real-time basis, the data communications generally don't have such a servicing requirement, but correct replication of data is essential. Thus, the data communications require a relatively low BER as compared to voice communications.

Difficulty in operation of a wireless communication system often results when a substantial amount of available resources are allocated for data communications. When a data communication (or multiple data communications) has/have been initiated, significant bandwidth is typically allocated to the data communication until the data communication is complete. In the case of a CDMA or TDMA system, the data communications may consume multiple code channels or time slots. If a voice communication is initiated during this high bandwidth data communication, it must also be allocated bandwidth by the system. However, if the bandwidth is already allocated to data communications, it is unavailable for voice communications. As a result, the call is blocked. Similarly, ongoing voice communications may be affected by the allocation of such bandwidth for data communications, resulting in bit errors and frame errors.

Thus, there is a need in the art for a methodology that provides sufficient voice communications capacity in such a system so that the voice communications are properly serviced, even during ongoing data communications.

SUMMARY OF THE INVENTION

Thus, to overcome the shortcomings of the prior systems, among other shortcomings, a wireless communication system constructed according to the present invention selectively delays serviced data communications to produce a desired level of voice communications capacity. In a method of operation according to the present invention, the system first determines whether the wireless communication system has sufficient voice communications capacity. If it is determined that the wireless communication system has insufficient voice communications capacity, the system determines a data communications delay that is required to provide sufficient voice communications capacity. Based upon its determination, the system then selectively delays some or all of the data communications to produce the sufficient voice communications capacity.

In differing operations, differing numbers of data communications are delayed. For example, in one operation, a single data communication serviced by the wireless communication system is selectively delayed to create the sufficient voice communications capacity. However, in another operation a plurality of data communications serviced by the wireless communication system are selectively delayed to create the sufficient voice communications capacity. When a plurality of data communications being serviced by the wireless communication system are selectively delayed, some of the plurality of the data communications serviced by the wireless communication system may be delayed by a first delay while other of the data communications serviced may be delayed by a second delay.

In one particular implementation of a wireless communication system operating according to the present invention, the data communications are serviced across the wireless link according to the Radio Link Protocol (RLP). In such implementation, a servicing Base Station Controller (BSC) selectively delays RLP frames. In other embodiments, other of the network infrastructure components in the data transmission path may provide the delay. In any case, because the delay is provided within a standard networking layer protocol layer, the addition of the delay is transparent to all other applications.

The delay may be applied to data communications travelling in either direction (e.g., data communications originating from the subscriber unit or terminated to the subscriber unit). In one application, data communications terminated at a serviced subscriber unit are selectively delayed prior to transmission over the wireless link to the subscriber unit. In another application, data communications received from a serviced subscriber unit are selectively delayed after receipt over the wireless link but prior to further transmission. In still another application, data communications intended for the serviced subscriber unit as well as data communications received from the serviced subscriber unit are both selectively delayed.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
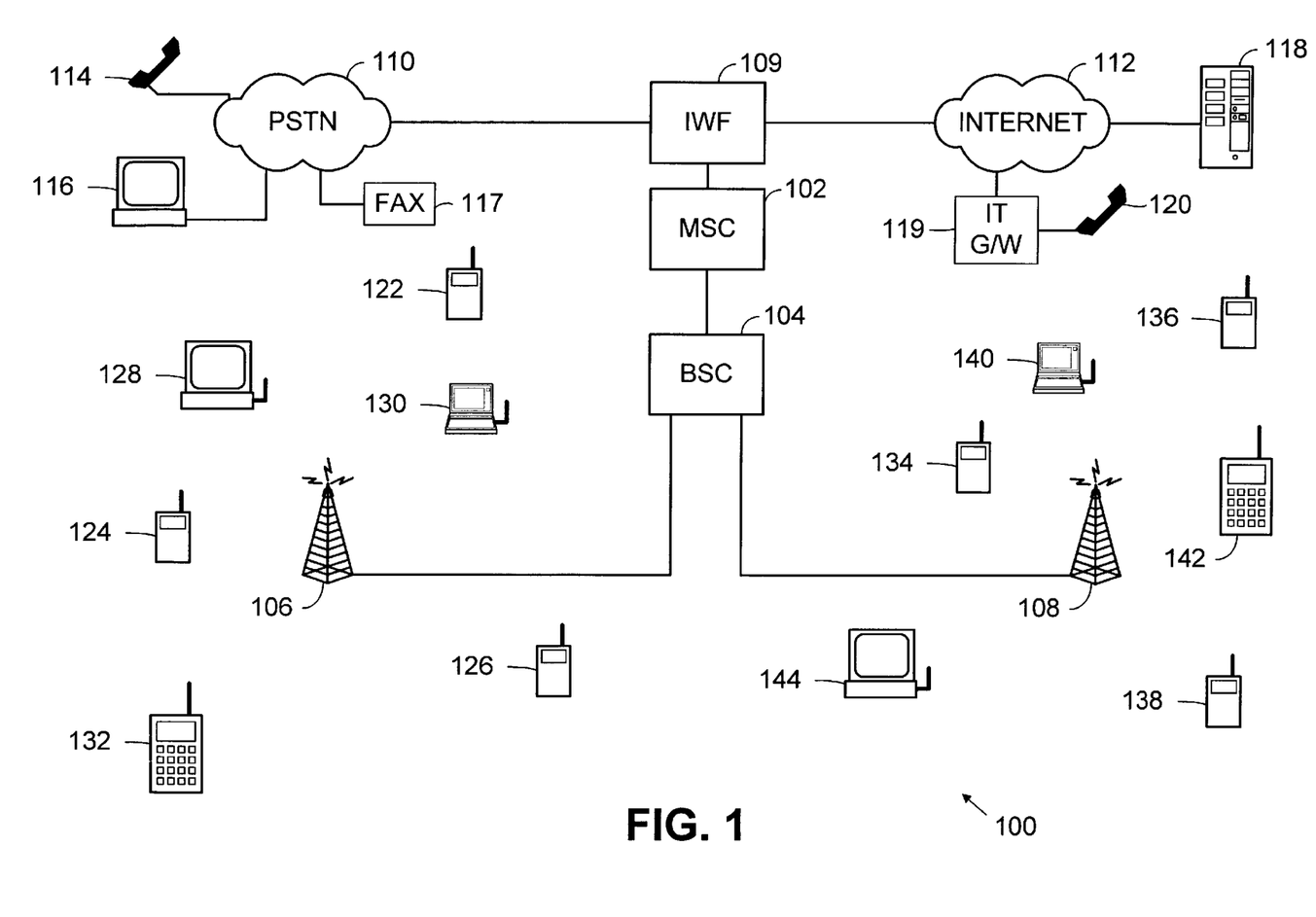
FIG. 1 is a system diagram illustrating a wireless communication system constructed according to the present invention in which delay is added to data communications when required to reduce data communication load on the wireless links to provide sufficient capacity for voice communications.

FIG. 1 is a system diagram illustrating a wireless communication system constructed according to the present invention in which delay is added to data communications when required to reduce data communications load on the wireless links to thereby provide sufficient capacity for voice communications. The wireless communication system 100 includes base stations 106 and 108, base station controller (BSC) 104, mobile switching center (MSC) 102 and an interworking function (IWF) 109. The wireless communication system 100 couples to the Public Switched Telephone Network (PSTN) and to the Internet 112 as shown. In other embodiments, the wireless communication system 100 couples to other networks as well, such networks including both public and private Wide Area Networks (WANs), local area networks and other networks over which voice and data communications may be routed.

The wireless communication system 100 services both voice communications and data communications. In servicing such voice communications and data communications, communication paths are established. In these paths, at least one path segment consists of a wireless link. The base stations 106 and 108 service these wireless links. In an example of a communication being serviced by the wireless communication system 100, a subscriber unit 122 and base station 106 establish a wireless link over which a voice communication is serviced. The wireless communication system 100 routes the voice communication between the PSTN 110 and the base station 106 over a path including the BSC 104, the MSC 102 and the IWF 109. (In another example of operation, a connection between the MSC 102 and the PSTN 110 is direct, without requiring the IWF 109 as an intermediate point.) The PSTN 110 routes the voice communication between the IWF 109 and telephone 114. Such voice communication path is maintained throughout the duration of the call. The establishment and servicing of such a voice communication is generally known in the art and will not be described further herein except as pertains directly to the present invention.

Likewise, voice communications may be established among and between subscriber units 124, 134, 136 and 138 and a phone 120 coupled to the Internet 112. When a voice communication is routed to a telephone 120 or other end-point device via the Internet 112, the voice communication is referred to as an "Internet telephony" communication and is routed to the telephone 120 via the IWF 102, the Internet 112 and an Internet Telephony Gateway (ITG) 119. Computers 128, 130, 140 and 144 as well as data units 132 and 142 may also support voice communications. In such case, the wireless communication system 100 also supports the voice communications with these computers 128, 130, 140 and 144 and data units 132 and 142.

The wireless communication system 100 also supports data communications for those subscriber units that support data communications, e.g., computers 128, 130, 140 and 144 and data units 132 and 142. While similarities exist in the manner in which voice communications and data communications are serviced, the requirements of each differ greatly. Voice communications, when active, require relatively lesser bandwidth than do data communications. However, the voice communications must be serviced in a real-time manner. For example, a data communication between computer 128 and web server 118 (coupled to the Internet 112) requires significant bandwidth during data transfers between the computer 128 and the web server 118. As another example, computer 144 may send a facsimile message to FAX machine 117 that is coupled to the PSTN 110. While these data communications require significantly more bandwidth than do voice communications, they do not require a real-time servicing.

In general, both voice and data communications may be easily serviced by the bandwidth provided by the wired portions of the wireless communication system 100. However, the wireless links between the base stations 106 and 108 and the subscriber units 122–144 provide a limited amount of bandwidth. Bandwidth provided by the wireless links is a function of the number of channels provided by each base station, the amount of traffic that may be serviced by each of the channels and the ability of the base stations 106 and 108 and the BSC 104 to service the wireless links. In the present example, the bandwidth available via the wireless links is less than the demands that may be placed upon them during peak loading periods (busy hours).

Thus, according to the present invention, data communications are managed so that sufficient bandwidth is provided across the wireless links to service voice communications. The manner in which the data communications are managed is by selectively delaying data communications within wired portions of the wireless communication system so that they proceed across the wireless links at a lesser data rate. By selectively delaying such data communications within the wired portions of the wireless communication system 100, loading on the wireless links for the data communications is selectively reduced. Resultantly, additional capacity on the wireless links to service voice communications is provided. In this fashion, voice communications effectively receive priority in servicing as compared to data communications.

In an example of such an operation, the wireless links are shared among a plurality of subscriber units. Transmissions across the wireless links are made based upon demands of ongoing communications. Thus, for example, when an ongoing voice communication has an idle period, the wireless link that has been allocated to the voice communication may be used to service a data communication (or another voice communication, as the case may be). Likewise, when an ongoing data communication has an idle period, the wireless link that has been allocated to service the ongoing data communication may be used to service a voice communication (or another data communication, as the case may be). According to the present invention, voice communications are serviced based only upon their own demands while data communications are serviced based upon their own demands and the demands placed upon a servicing cell/sector. Thus, an increase in voice communications demand may cause a lesser degree of service to be provided to ongoing or desired data communications.

In one particular embodiment of the present invention, the wireless communication system 100 operates according to the Code Division Multiple Access (CDMA) standard for both voice communications and data communications. In such case, the wireless interface between the base stations 106 and 108 and the subscriber units 122–144 operates according to the IS-95 standard (or subsequent IS-95 based standards). Further, in such case, data communications are serviced by the wireless communication system 100 according to the IS-99 standard (or subsequent IS-99 based standards). Under these standards, the data communication and voice communication users co-exist in the wireless communication system 100 and vie for available capacity. Capacity of a CDMA cell or sector is essentially "soft" and depends on a number of parameters, e.g., soft hand-off, user activity, etc. According to the present invention, voice communication receive priority within the wireless communication system 100 to meet the system goal of providing priority in service to the voice communication users.

The principles of the present invention apply equally well to other wireless communication systems that operate according to differing standards as well. For example, in Time Division Multiple Access (TDMA) systems which time-share the available channels across the wireless link, the principles of the present invention may also be applied to give voice communication users priority in obtaining bandwidth across the wireless link. In such case, the data communications would be managed so they consume a desired amount of available slots.

Figure 2:
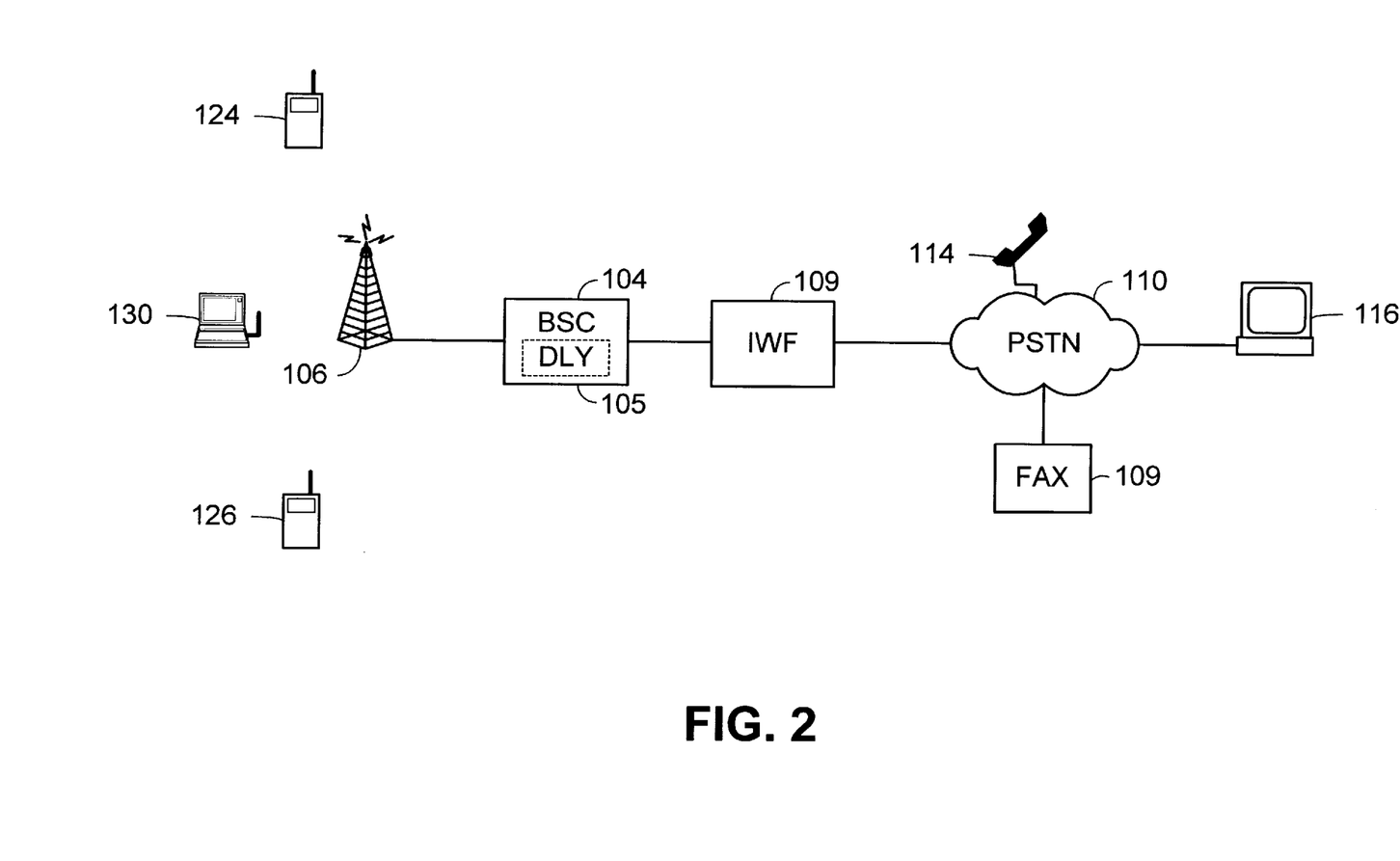
FIG. 2 is a partial system diagram of the wireless communication system of FIG. 1 illustrating in detail a communication path employed to service data communications for a subscriber unit and the manner in which delay is added to data communications passing along such path.

FIG. 2 is a partial system diagram of the wireless communication system of FIG. 1 illustrating in detail a communication path employed to service data communications for a subscriber unit and the manner in which delay is added to data communications passing along such communication path. As a simple example of the operation of the wireless communication system according to the present invention, the base station 106 services a voice communication between voice communication subscriber 124 and telephone 114 over a single channel. In the example, the wireless communication system also services high bandwidth data communications between data communication subscriber 130 and computer 116 on the single channel, thus sharing available bandwidth of the single channel with the ongoing voice communication. However, the single channel provides a limited bandwidth for both the ongoing data communication and on-going voice communication. Thus, the voice communication and data communication vie for the bandwidth of the single channel.

During idle periods of the voice communication, the data communication may consume all available bandwidth of the single channel. However, when the voice communication requires a portion, or all of the bandwidth provided by the single channel, the data communication must be queued or otherwise held up so that the voice communication may be serviced. According to the present invention, the data communication is delayed at the BSC 104, via a delay element 105 present in the BSC 104. Both data communications emanating from the computer 130 and data communications emanating from the computer 116 may be delayed at the BSC 104 to achieve the desired delay.

Delay of the data communications at the BSC 104 not only delays the rate at which the data communications must be serviced by the base station 106 across the wireless link to the computer 130 but will typically also cause the computer 116 to send the data communications at a lower rate. According to one aspect of the present invention, it is desired to create a Round Trip Delay (RTD) between computer 130 and computer 116, the RTD including the time that it takes for a data communication to reach its destination from its source and an acknowledgement to be returned to, and received by the source. By adding delay via delay element 105 of the BSC 104 to the data communication, a desired increase in RTD will be established. The computer 116 (e.g., via a Transfer Control Protocol communication layer operating in the computer 116) will then adjust the data rate of its data communication transmissions to the computer 130 based upon the actual RTD of ongoing communications. With a reduced data rate of the ongoing data communications, lesser bandwidth usage of the single channel by the data communication is achieved, such lesser bandwidth usage reducing data communication traffic on the wireless link and increasing available bandwidth for voice communications.

According to another operation of the present invention, a portion of the bandwidth provided by the single channel must be reserved so that subsequently established voice communications may be serviced. For example, subscriber 126 may send or receive a call at any time. However, if all of the bandwidth provided by the single channel is being consumed by the ongoing voice communication and data communication, the subscriber 126 is blocked. Thus, to maintain an available bandwidth, the delay provided by delay element 105 is adjusted so that the combined bandwidth consumed by the voice communication and data communication does not consume all of the bandwidth provided by the single channel.

The principles described with reference to FIG. 2 may be easily extended to a system in which multiple voice communications and multiple data communications are serviced by the base station 106. In such case, some or all of the data communications serviced by the base station 106 are selectively delayed in order to service ongoing voice communications or to provide an available bandwidth that may be serviced by the base station. As will further with respect to FIGS. 5 and 6, delay may be introduced into, or removed from, some or all of the ongoing data communications to establish/maintain a desired operating bandwidth buffer.

Figures 3A, 3B:
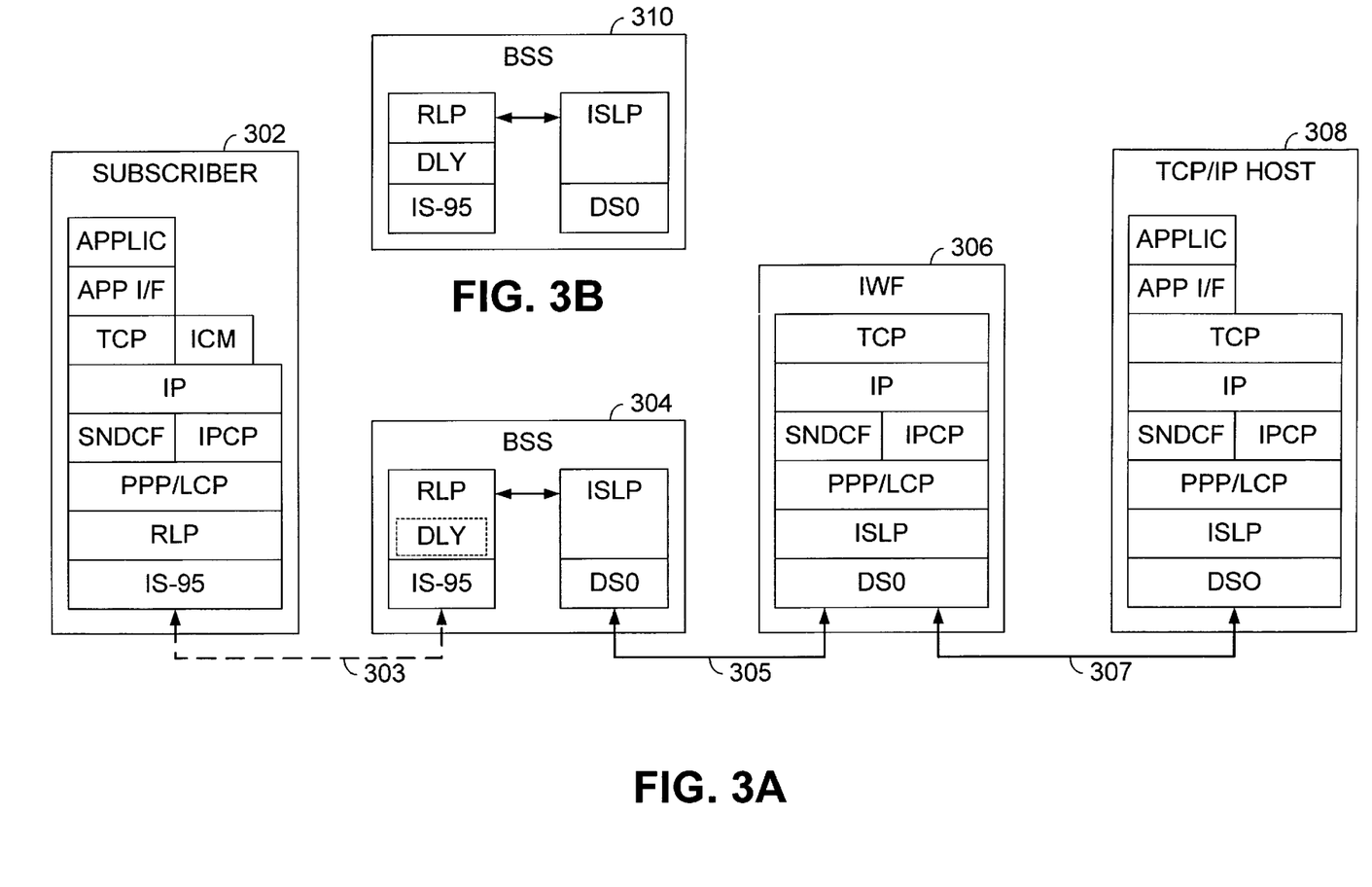
FIG. 3A is a block diagram illustrating components of a wireless communication system constructed according to the present invention with particular reference to the protocol layers supported by each of the system components in an IS-99 compatible CDMA system.
FIG. 3B is a block diagram illustrating an alternate construction of a base station subsystem previously introduced in FIG. 3A.

FIG. 3A is a block diagram illustrating components of a wireless communication system constructed according to the present invention with particular reference to the protocol layers supported by each of the system components in an IS-99 compatible CDMA system. Illustrated in FIG. 3A are the various Industry Standard Organization (ISO) protocol layers supported by each of the components of the wireless communication system. These protocol layers are employed to service data communications within the wireless communication system. As is generally known, the various protocol layers provide portability for applications between compliant systems and between applications of differing vendors. In the present example, application programs active on the subscriber unit 302 and a TCP/IP host 308 (e.g., computer 116 of FIG. 1) operate in conjunction with one another. Examples of such application programs would be FAX machines, a Web Server/Web browser combination, file download applications, video teleconferencing applications, remote terminal application and other application programs that require data communications between remotely located machines.

Subscriber unit 302 supports a full protocol stack. At the lowest level of the protocol stack of the subscriber unit 302 is the IS-95 physical layer which manages the wireless link 303 between the subscriber unit 302 and its serving Base Station Subsystem (BSS) 304. Riding upon the IS-95 physical layer is the Radio Link Protocol (RLP). The RLP is a pure no-acknowledgement (NAK) based protocol that effectively reduces the Frame Error Rate (FER) produced by the wireless link 303 between the subscriber unit 302 and BSS 304 by requesting retransmission of frames when required. When the RLP at the subscriber unit 302 (receiving end) detects a frame error or a lost frame (e.g., data sent from a subscriber unit to the base station or vice versa), it sends back a NAK requesting retransmission of the frame. A timer is set for the missing frame. When the timer expires for the first attempt, the timer is reset and two NAKs are sent if the timer expires again, three NAKs are sent. Each NAK triggers exactly one retransmission of the erroneous or lost frame. Such operation tends to cause desired transmissions to be successfully sent across the wireless link 303.

A Point to Point Protocol (PPP)/Link Control Protocol (LCP) layer rides above the RLP in the subscriber unit. Above the PPP/LCP layer rides a Subnetwork Dependent Convergent Function (SNDCF) layer which allows the data communication to be compliant with an X.25 gateway/router. Also riding above the PPP/LCP layer is an Internet Protocol Control Protocol (IPCP) layer which provides the control protocol for an Internet Protocol (IP) layer riding above it.

Riding above the IP layer are the Transmission Control Protocol (TCP) and Internet Control Message Protocol (ICM) layers. TCP provides reliable transport service and is an Acknowledge (ACK) based sliding window protocol. The ICM layer is the layer that the IP layer uses to report errors and exceptions and may also include informational messages. An Application Interface (APP I/F) layer rides above the TCP and provides an interface between the TCP layer and the Application program being run.

The BSS 304 supports a reduced protocol stack that supports the IS-95 physical link to the subscriber unit 304 and the RLP layer. The BSS 304 also supports a DSO physical link which is a framing specification for digital signals in the North American digital transmission hierarchy at the zeroth DS level. A DS0 signal has a transmission rate of 64 kilobits per second. Alternately, the DSO layer could be replaced with various other wired communication protocol physical layers. Riding above the DSO layer is the InterSystem Link Protocol (ISLP) layer for Data Services. The data communications are passed between the RLP layer and the ISLP layer within the BSS 304 during ongoing communications.

The IWF 306 is employed in the present example to support IP data communications passing over the PSTN. It communicates with the BSS 304 via a physical link 305 (the physical link 305 may a wired link, a microwave link, a fiber optic link or another link, or combination of links, that conforms to the DSO layer standards). The IWF 306 supports the DSO physical layer. Above the DSO physical layer resides the ISLP layer, the PPP/LCP layer, the SNDCF and IPCP layer, the IP layer and the TCP layer. Note that the application program and APP I/F are not run on the IWF 306. However, since the IWF 306 includes the TCP layer, it may perform data communication management at the TCP layer level.

The IWF 306 communicates with the TCP/IP host via physical link 307 which may be a wired link, a microwave link, a fiber optic link or another link, or combination of links, that conforms to the DSO layer standards. The TCP/IP host 308 also supports the ISLP layer, the PPP/LCP layer, the SNDCF and IPCP layer, the IP layer and the TCP layer as shown. The TCP/IP host also supports the APP I/F layer which supports the Application program that communicates with the application program running on the subscriber unit 302. Note that the application program and APP I/F are not run on the IWF 306.

In operation, the application program resident on the TCP/IP host 308 communicates with the application program resident on the subscriber unit 302 via the various communication mechanisms and paths in place between the two. In the present example, the TCP/IP host 308, at the TCP layer, sends a first group of data segments and remains inactive until the ACK for the first segments is received. The TCP layer is responsible for guaranteeing that all communications sent by the application program of the TCP/IP host 308 reach the application program of the subscriber unit 302. The TCP layer operates according to a sliding window protocol such that it transmits a number of individual data segments and awaits ACKs for the individual segments within a Round Trip Timer (RTT) period. If the ACK is not received within the RTT period, the segment is retransmitted. The window is slid when the ACK for the first segment is received to the time the second segment was sent, and so on as ACKs for additional segments are received. The IS-99 standard specifies that the Maximum Segment Size (MSS) should be no smaller than 536 bytes. The RTT is generally estimated using Karn's algorithm for exponential back off and the current and previous round trip delay times for successful data communications sent to the subscriber unit 302.

In a particular operation, the TCP layer of TCP/IP host transmits a plurality ot TCP segments to the BSS 304. The TCP segments reach the RLP layer of the BSS 304 (after crossing intermediate layers and traversing communication paths) and they are converted into RLP frames. Usually, one TCP segment is converted into multiple RLP frames. The RLP frames are transmitted across the wireless link 303 to the subscriber unit 302. Upon receipt of the RLP frames, the RLP layer in the subscriber unit reconstructs the TCP segment and passes the TCP segment to the TCP layer in the subscriber unit 302. The TCP layer of the subscriber unit 302 then transmits an ACK corresponding to the received TCP segment that is relayed to the TCP layer of the TCP/IP host 308.

The duration of time starting with the transmission of a data segment at the TCP layer of the TCP/IP host 308 and ending with the receipt of a corresponding ACK at the TCP layer of the TCP/IP host 308 is referred to as the RTD for the communication. The average RTD for TCP data segments in the example of FIG. 3A depends on two factors: (1) the delay in the wireless link 303 in successfully transmitting a segment (which may include time lost in RLP retransmissions when one or more frames of the segment are lost); and (2) the delay in the wired network between the BSS 304 and the remote TCP/IP host 308.

Due to the transmission nature of the sliding window protocol, if the RTD is greater than the WS time, the wireless link 303 for the data communication remains active for the duration it takes the RLP to transmit (or retransmit) the RLP frames corresponding to the WS segments. Hence, the data activity is given by Av in Equation (1).

$$Av = Aws/RTD \qquad \text{Equation (1)}$$

Where:

Av=average data activity over the wireless link 303;

Aws=average time air link is active while transmitting WS segments; and

RTD=average time delay between sending a TCP segment and receiving ACK.

The data activity can be reduced by introducing delay to all frames in both the uplink and downlink direction, or either direction at the BSS 304. This delay ultimately translates to increasing the RTD for the corresponding TCP segments. Resultantly, the TCP layer of the TCP/IP host 308 adjusts its RTT based upon the larger RTD thereby reducing the rate at which the TCP/IP host 308 transmits TCP segments to the BSS 304, intended for the subscriber unit 302.

According to the present invention a delay is selectively added to all or a portion of the RLP frames at the BSS 304. The adjusted average data activity over air with the inclusion of such additional delay may be represented by Equation (2) as:

$$A'v = Aws/(RTD+delay) \qquad \text{Equation (2)}$$

Where:

A'v=adjusted average data activity over the wireless link 303;

Aws=average time air link is active while transmitting WS segments;

RTD=average time delay between sending a TCP segment and receiving ACK; and

Delay=average delay added to RLP frames or TCP segments.

A fixed amount of delay may be added to frames/segments in both the uplink (data communications from subscriber unit 302) and the downlink (data communications from the TCP/IP host 308. By adding this delay, the RTD' (RTD+delay) increases as is noted by the TCP layers of the subscriber unit 302 and the TCP/IP host 308. Initially, the addition of delay leads to a few (e.g., one or two) retransmissions of TCP segments. But, with the TCP layer following Karn's algorithm, the TCP layer will adjust the RTT to correspond to the new value of RTD'. The increase in RTT, coupled with the added delay, leads to a decrease in the data transmission activity over the wireless link 303 due to the data communication users. Thus, by introducing the delay, some "soft" capacity of the wireless link 303 is freed so that new voice communication users may be added in the corresponding cell or sector of the base station.

FIG. 3B is a block diagram illustrating an alternate construction of a base station subsystem 310 previously introduced in FIG. 3A. As is shown in FIG. 3A, delay is added to the RLP frames via a delay agent (DLY) constructed (e.g., a software program) within the RLP layer of the BSS 304. However, as is illustrate in FIG. 3B, the delay could also be added to the RLP frames via a delay shim (DLY) resident between the IS-95 physical layer and the RLP layer of the BSS 310. In either case, delay is selectively added to the RLP frames to decrease loading on the wireless link 303.

Figure 4A:
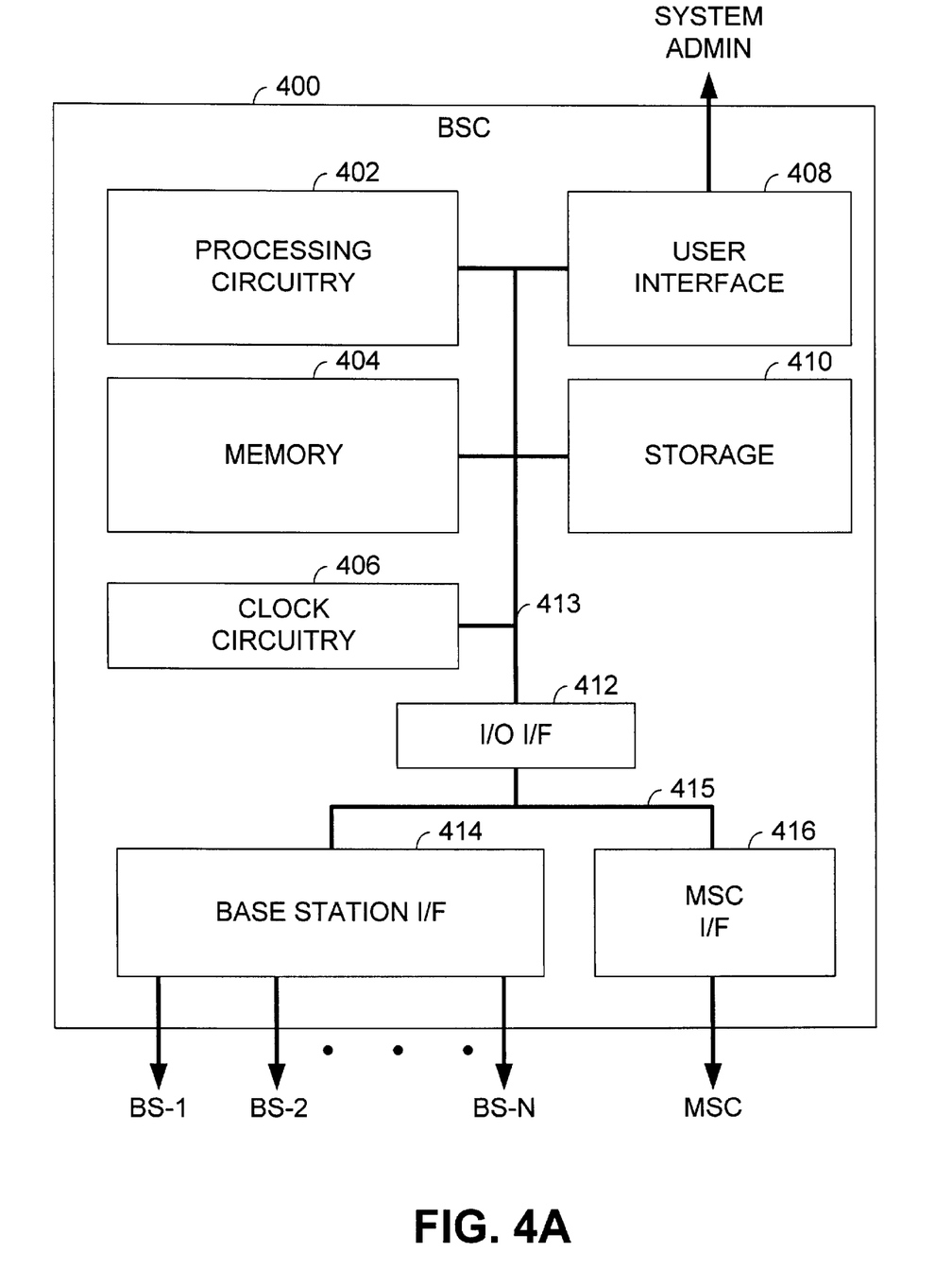
FIG. 4A is a block diagram illustrating a base station controller constructed according to the present invention that adds delay to serviced data communications to provide sufficient capacity for voice communications serviced by a coupled base station.

FIG. 4A is a block diagram illustrating a base station controller constructed according to the present invention that adds delay to serviced data communications to provide sufficient capacity for voice communications serviced by a coupled base station. The BSC 400 interfaces to a plurality of base stations via a base station interface 414. The BSC 400 also interfaces to an MSC via an MSC interface 416. The base station interface 414 and MSC interface 416 couple to an I/O interface 412 via a peripheral bus 412.

A processor bus 413 couples to the I/O interface 412. To the processor bus 413 couple processing circuitry 402, memory 404 (e.g., RAM, ROM, etc.), clock circuitry 406, a user interface 408 and storage 410 (e.g., magnetic disk storage, tape drive storage, optical disk storage, etc.). The user interface 408 allows a system administrator to access the BSC 400 to perform various operations. The components of the BSC 400 execute software instructions that are stored on the storage 410 and the memory 404. These software instructions provide the various protocol layer operations previously described. In providing these protocol layer operations, data communications are selectively delayed to increase or decrease corresponding data communication load within served cells/sectors.

Figure 4B:
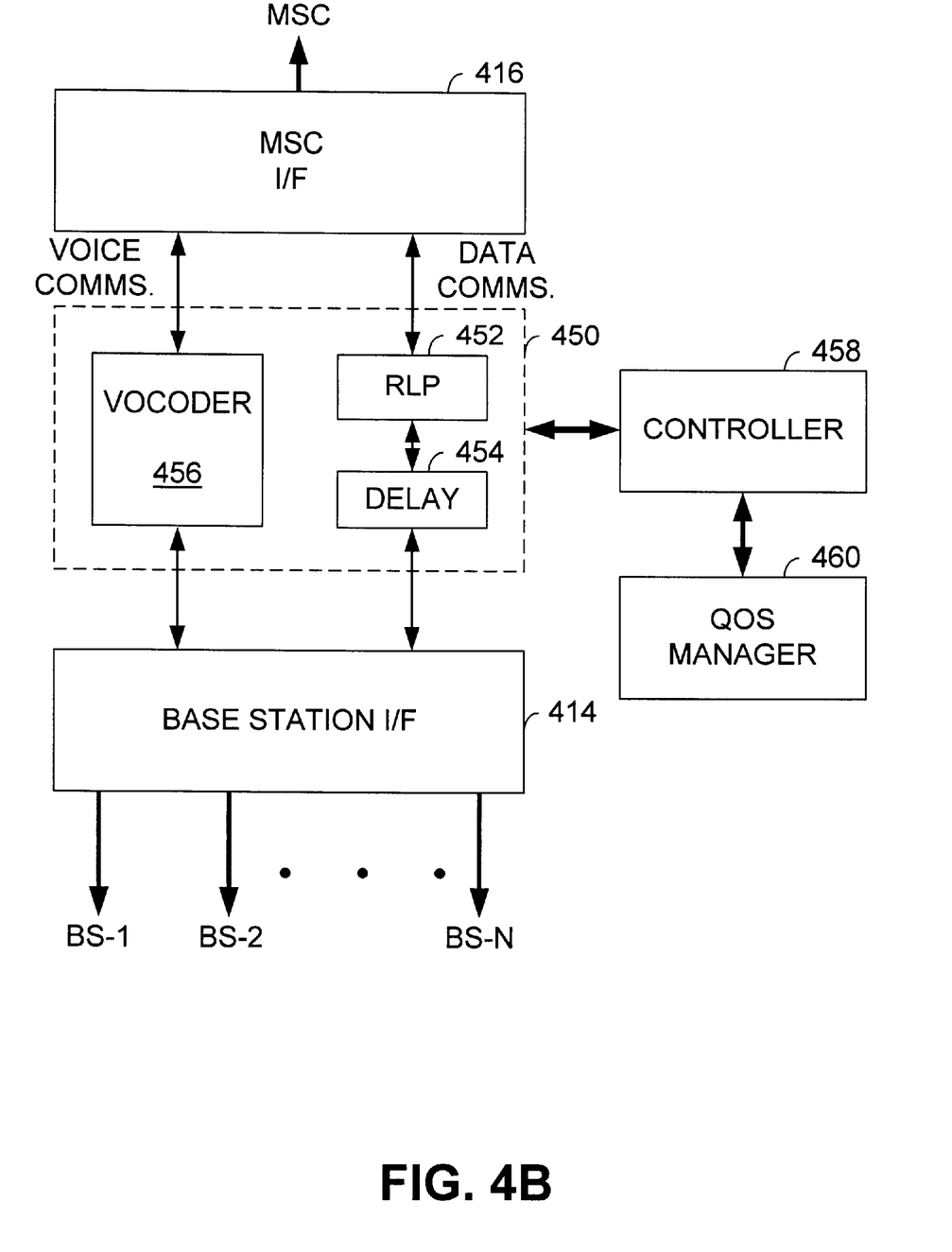
FIG. 4B is a block diagram illustrating a portion of the base station controller of FIG. 4A detailing construction of a selector bank subsystem and the manner in which the selector bank subsystem is employed to introduce delay according to the present invention.

FIG. 4B is a block diagram illustrating a portion of the base station controller of FIG. 4A detailing construction of a selector bank subsystem (SBS) 450 and the manner in which the selector bank subsystem is employed to introduce delay according to the present invention. As shown, the SBS 450 couples between the MSC interface 416 and the base station interface 414. The SBS 450 includes various hardware and software components employed to route communications. The construction of SBSs is generally known in the art and will not be discussed except as to expand upon discussion of the present invention.

As is shown, voice communications are routed between the MSC interface 416 and the base station interface 414 via Vocoder 456. However, data communications are routed via an RLP block 452 and a delay block 454. The delay block 454 introduces the selective delay into data communications passing through the SBS 450. The RLP block 452 and the delay block 454 are executed via software instructions using components available on the SBS 450. In this fashion, the principles of the present invention may be implemented without requiring expensive hardware modifications to the BSC.

A controller 458 couples a Quality of Service (QoS) manager 460 to the SBS 450 to facilitate and manage the selective delay of data traffic. The QoS manager 460 performs computations to determine the number of data communications to be delayed and the delay to be introduced into each delayed communication to achieve the desired goal of providing voice traffic capacity. Further, the QoS manager 460 operates to determine from which data communications to remove delay and the amount of delay to be removed.

Figure 5:
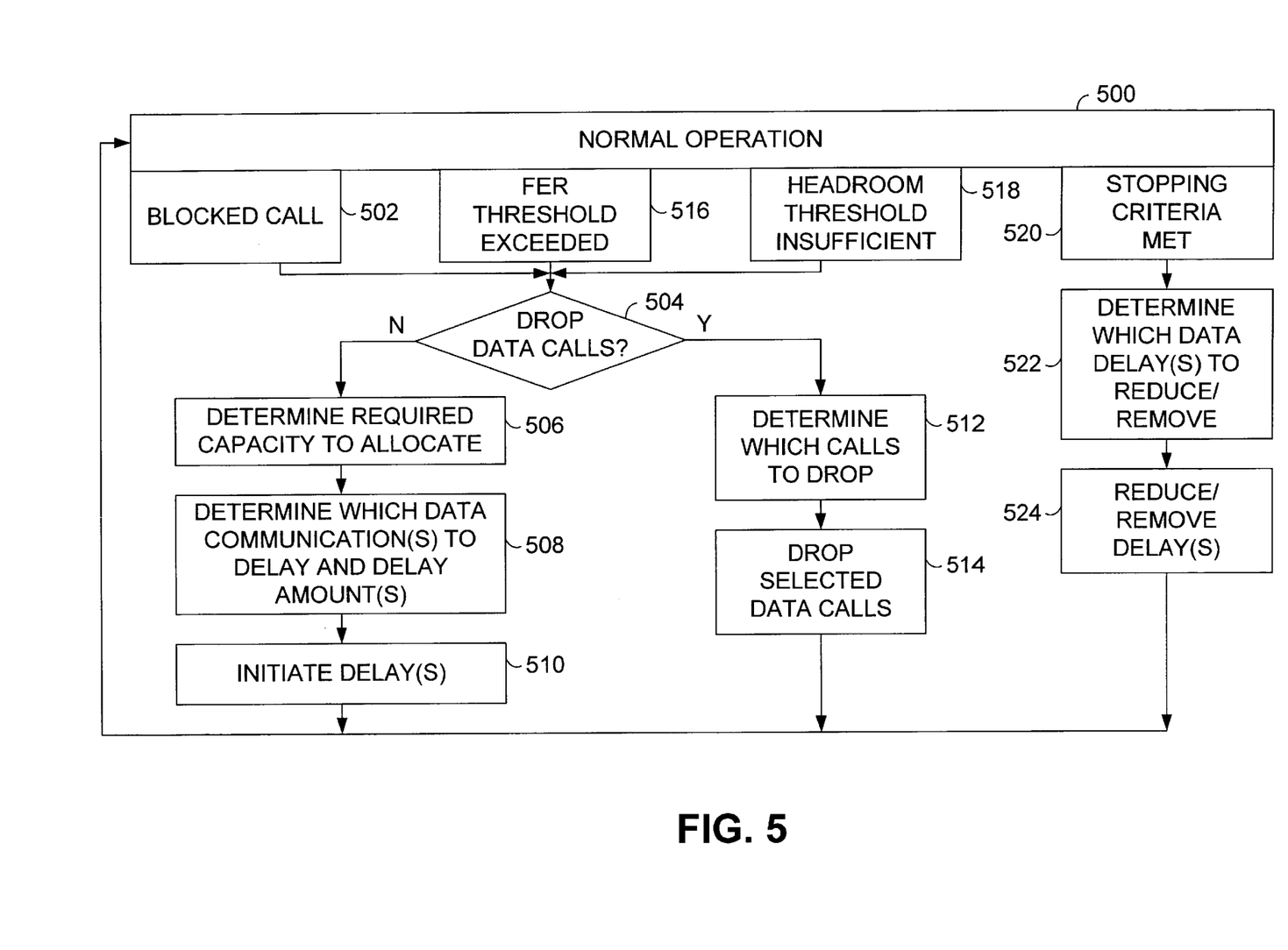
FIG. 5 is a logic diagram illustrating operation according to the present invention in selectively adding delay to data communications, in dropping data communications and in removing delay from data communications.

FIG. 5 is a logic diagram illustrating operation according to the present invention in selectively adding delay to data communications, in dropping data communications and in removing delay from data communications. During normal operation at step 500, operation continues as has been previously established. In one such previously established operation for a particular cell/sector of a wireless communication system, no data communications are selectively delayed.

Considering such a starting point for operation, a blocked call may be sensed at step 502, a frame error rate threshold may have been exceeded at step 516 or a headroom threshold has been detected as insufficient at step 518. At each of these steps 502, 516 and 518, it is effectively determined that existing and potential voice communications are not properly being served within the cell/sector under consideration. From each of these steps 502, 516 and 518, operation proceeds to step 504 where it is determined whether to drop a data communication call. If it is determined that a data communication call should be dropped, at step 512, it is determined which data communication call(s) to drop, with such call(s) being dropped at step 514. From step 514, operation returns to step 500. In making the determination at step 512, a QoS manager may be queried to determine which data calls are to be dropped. In making its determination, the QoS manager performs a ranking of the ongoing data communications to determine which data communications are to be dropped. Ranking of data communications in such case may be performed based upon a predetermined priority scheme from a subscriber unit identity perspective, from a level of use perspective or from another perspective of fairness among subscribers of equal standing or based upon which subscribers have a higher standing.

However, if at step 504, it is determined not to drop any data communication call(s), operation proceeds to step 506 where it is determined what level of additional capacity is to be allocated within the cell/sector. Based upon the determination of required capacity at step 506, it is next determined which data communication(s) are to be delayed and the amount of delay to be selectively added to each of the data communication(s). In making the determination at steps 506 and 508, a QoS manager may be queried to determine the data communications that are to be delayed and the estimated delay to be applied to each. In such case, the QoS manager would be queried and operation would stop, awaiting a response from the QoS manager. Upon the response, operation would proceed to step 510 where such delay(s) are then selectively initiated at step 510. From step 510, operation returns to step 500.

After such operation, at step 500, at least one data communication call being serviced by the wireless communication system within the subject cell/sector is being delayed by a determined delay amount. When the traffic within the cell/sector is reduced to a particular level, a stopping criterion is met at step 520. When such stopping criteria is met, it is next determined which data communication delays to remove and/or reduce at step 522. This determination is made so that a particular capacity within the cell/sector will still be available after the data communication delays are reduced and/or removed. From step 524, operation proceeds to step 524 where the particular delays are reduced/removed accordingly. From step 522, operation returns to step 500. In determining which data delays to reduce/remove at step 522, the QoS manager may be queried. The QoS manager makes its determination based upon a determined set of criteria and then responds with its determination.

Figure 6:
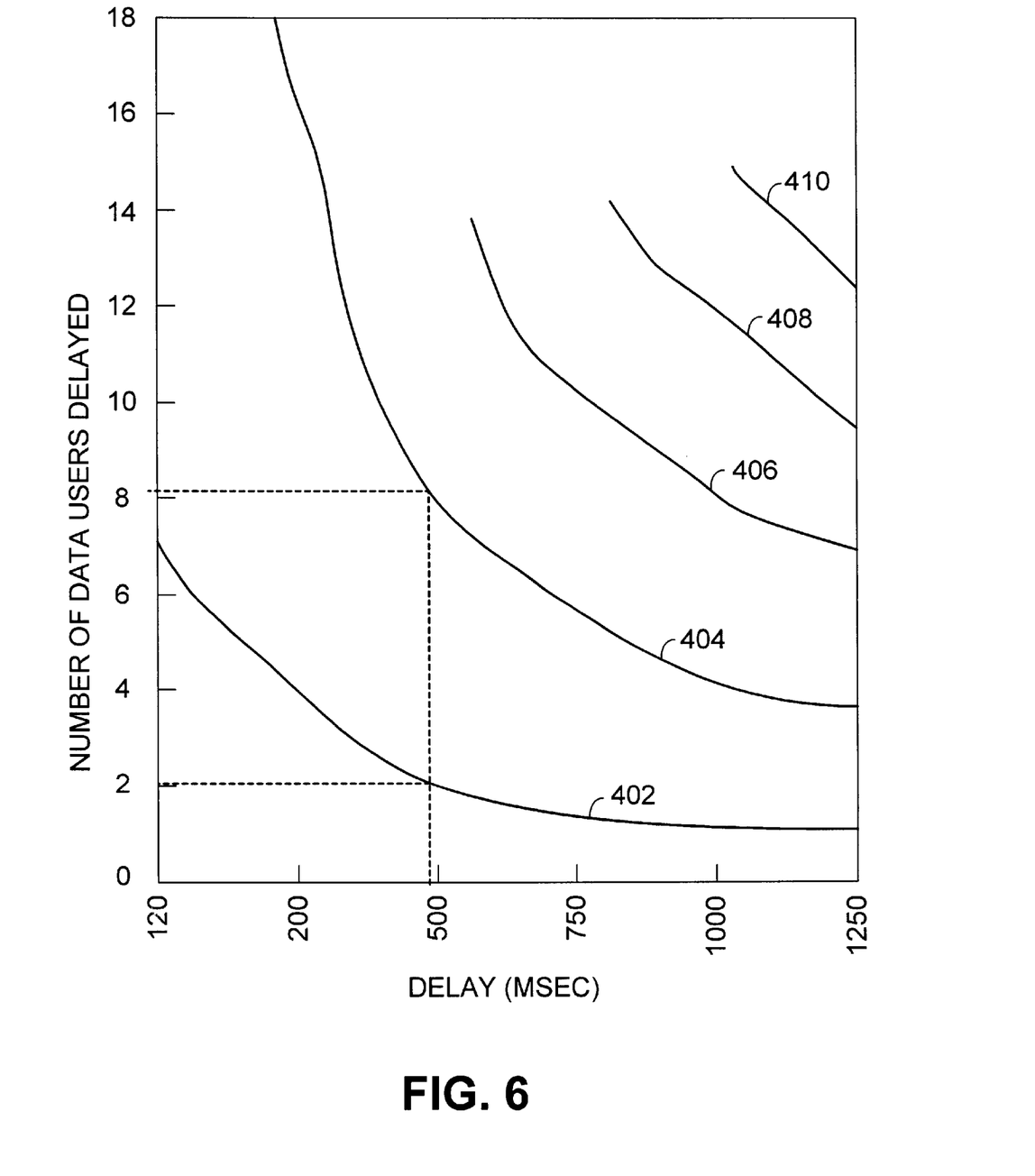
FIG. 6 is graph illustrating behavior of a wireless system constructed according to the present invention used to estimate the voice communications capacity that will be provided for voice communications by selectively adding delay to data communications.

FIG. 6 is graph illustrating behavior of a wireless system constructed according to the present invention used to estimate the voice communications capacity that will be provided for voice communications by selectively adding delay to data communications. Plotted on the horizontal axis are delays in milliseconds (Ms) that would be added to one or more data communications. Plotted on the vertical axis is the number of data communication users delayed. Curves plotted on the graph represent particular capacity levels achieved by delaying a particular number of users for a particular delay period. In the curves, it was assumed that the Eb/No required for both voice communication and data communication users is seven (7) dB. Further, it is assumed that the maximum loading is 50%, the average voice activity is 0.45, the average data source activity is 0.75 and the other cell interference is 0.55 of the same call interface.

For example, curve 402 is a one (1) Erlang of voice capacity plot, curve 404 is a two (2) Erlang of voice capacity plot, curve 406 is a three (3) Erlang of voice capacity plot, curve 408 is a four (4) Erlang of voice capacity plot and curve 410 is a five (5) Erlang of voice capacity plot. Along the curve 402, a particular number of data communication users are plotted against a delay, the combination of which would free one (1) Erlang of voice capacity. For example, if two (2) data communication users were each delayed for 500 mS, one (1) Erlang of voice capacity would be freed. Further, if eight (8) data communication users were each delayed by 500 mS, two (2) Erlangs of voice capacity would be freed.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for operating a wireless communication system to manage available wireless capacity, the method comprising:

servicing a plurality of wireless subscriber units, wherein a first group of wireless subscriber units of the plurality of wireless subscriber units receives voice service and a second group of wireless subscriber units of the plurality of wireless subscriber units receives data service;

determining that the wireless communication system has insufficient capacity to adequately service the voice communications for the first group of wireless subscriber units;

identifying a plurality of ongoing data communications between serviced wireless subscriber units of the second plurality of subscriber units and corresponding data communication devices;

determining a delay to introduce into the plurality of ongoing data communications;

introducing the delay into the plurality of ongoing data communications;

wherein by introducing the delay into the plurality of ongoing data communications, the round trip delay of the plurality of ongoing data communications increases;

wherein because the round trip delay of the plurality of ongoing data communications increases, the corresponding data communication devices apply data to the plurality of ongoing data communications at reduced rates; and wherein by the corresponding data communication devices reducing the rate at which they apply data to the plurality of ongoing data communications, the wireless capacity used by the plurality of ongoing data communications is thereby reduced to increase the wireless capacity available for the voice service provided to the first group of the wireless subscriber units.

2. The method of claim 1, wherein some of the plurality of subscriber units are both in the first group and in the second group.

3. The method of claim 1, wherein the delay is introduced into the plurality of data communications at an intermediate protocol layer residing above a physical protocol layer.

4. The method of claim 3, wherein the introduction of the delay at the intermediate protocol layer causes upper protocol layers of the corresponding data communication devices to reduce the rate at which they apply data to corresponding intermediate protocol layers.

5. The method of claim 1, wherein a first delay level is introduced into some of the plurality of ongoing data communications and a second delay level is introduced into other of the plurality of ongoing data communications.

6. The method of claim 1, wherein the delay is introduced into the plurality of data communications at an intermediate protocol layer residing above a physical protocol layer by selectively delaying Radio Link Protocol frames.

7. The method of claim 6, wherein the introduction of the delay at the intermediate protocol layer causes Transmission Control Protocol layers of the corresponding data communication devices to reduce the rate at which they apply data to corresponding intermediate protocol layers.

8. The method of claim 1, wherein because the round trip delay of the plurality of ongoing data communications increases, the serviced wireless subscriber units of the first plurality of subscriber units also apply data to the plurality of ongoing data communications at reduced rates.

9. The method of claim 8, herein the introduction of the delay at the intermediate protocol layer further causes upper protocol layers of the serviced wireless subscriber units of the first plurality of subscriber units to reduce the rate at which they apply data to corresponding intermediate protocol layers.

10. The method of claim 1, wherein introduction of the delay into the plurality of ongoing data communications is performed by a base station controller.

11. A base station controller comprising:

a base station interface that interfaces the base station controller to a base station;

a mobile switching station interface that interfaces the base station controller to a mobile switching center;

wherein the base station controller services communications for a plurality of wireless subscriber units via the base station, wherein a first group of wireless subscriber units of the plurality of wireless subscriber units receives voice service and a second group of wireless subscriber units of the plurality of wireless subscriber units receives data service;

processing circuitry that:

determines that the base station has insufficient capacity to service the voice communications for the first group of wireless subscriber units;

identifies a plurality of ongoing data communications between serviced wireless subscriber units of the first plurality of subscriber units and corresponding data communication devices;

determines a delay to introduce into the plurality of ongoing data communications;

introduces the delay into the plurality of ongoing data communications;

wherein by introducing the delay into the plurality of ongoing data communications, the round trip delay of the plurality of ongoing data communications increases;

wherein because the round trip delay of the plurality of ongoing data communications increases, the corresponding data communication devices apply data to the plurality of ongoing data communications at reduced rates; and wherein by the corresponding data communication devices reducing the rate at which they apply data to the plurality of ongoing data communications, the wireless capacity used by the plurality of ongoing data communications is thereby reduced to increase the wireless capacity available for the voice service provided to the first group of the wireless subscriber units.

12. The base station controller of claim 11, wherein some of the plurality of subscriber units are both in the first group and in the second group.

13. The base station controller of claim 11, wherein the base station controller introduces the delay into the plurality of data communications at an intermediate protocol layer residing above a physical protocol layer.

14. The base station controller of claim 13, wherein the introduction of the delay at the intermediate protocol layer causes upper protocol layers of the corresponding data communication devices to reduce the rate at which they apply data to corresponding intermediate protocol layers.

15. The base station controller of claim 11, wherein a first delay level is introduced into some of the plurality of ongoing data communications and a second delay level is introduced into other of the plurality of ongoing data communications.

16. The base station controller of claim 11, herein the delay is introduced into the plurality of data communications at an intermediate protocol layer residing above a physical protocol layer by selectively delaying Radio Link Protocol frames.

17. The base station controller of claim 1, wherein the introduction of the delay at the intermediate protocol layer causes Transmission Control Protocol layers of the corresponding data communication devices to reduce the rate at which they apply data to corresponding intermediate protocol layers.

18. The base station controller of claim 1, wherein because the round trip delay of the plurality of ongoing data communications increases, the serviced wireless subscriber units of the first plurality of subscriber units also apply data to the plurality of ongoing data communications at reduced rates.

19. The base station controller of claim 18, wherein the introduction of the delay at the intermediate protocol layer further causes upper protocol layers of the serviced wireless subscriber units of the first plurality of subscriber units to reduce the rate at which they apply data to corresponding intermediate protocol layers.

20. A method for operating a wireless communication system to manage available wireless capacity within a service coverage area serviced by a base station, the method comprising:

servicing a plurality of wireless subscriber units within the service coverage area, wherein a first group of wireless subscriber units of the plurality of wireless subscriber units receives voice service and a second group of wireless subscriber units of the plurality of wireless subscriber units receives data service;

determining that the base station has insufficient capacity to adequately service the voice communications for the first group of wireless subscriber units;

identifying an ongoing data communication between a serviced wireless subscriber unit of the second plurality of subscriber units and a corresponding data communication device;

determining a delay to introduce into ongoing data communication;

introducing the delay into the ongoing data communication;

wherein by introducing the delay into the ongoing data communication, the round trip delay of the ongoing data communications increases;

wherein because the round trip delay of the ongoing data communication increases, the corresponding data communication device applies data to the ongoing data communication at a reduced rate;

wherein because the round trip delay of the ongoing data communication increases, the serviced wireless subscriber unit also applies data to the ongoing data communication at a reduced rate; and wherein by the serviced wireless subscriber unit and the serviced subscriber unit reducing the rate at which they apply data to the ongoing data communication, the wireless capacity used by the ongoing data communication is thereby reduced to increase the wireless capacity available for the voice service provided to the first group of the wireless subscriber units.

* * * * *